June 11, 1968   T. L. HEYING ET AL   3,388,092
RESINS AND ELASTOMERS FROM SILOXY CARBORANYL POLYMERS
Filed July 21, 1964
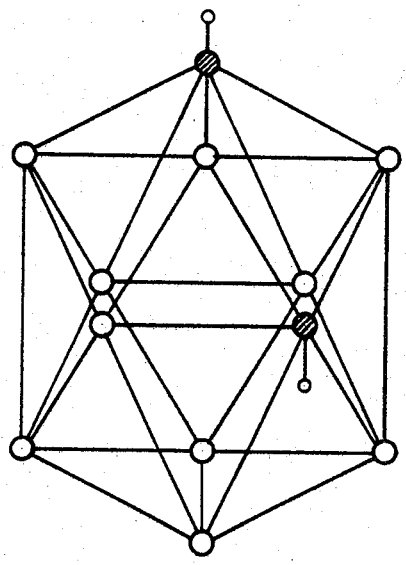
○ BORON
◉ CARBON
∘ HYDROGEN ON CARBON
(HYDROGEN ATOMS ON
BORON OMITTED FOR
CLARITY)
INVENTORS:
THEODORE L. HEYING
STELVIO PAPETTI
OTTO G. SCHAFFLING
BY Walter D. Hunter
AGENT 3,388,092
RESINS AND ELASTOMERS FROM SILOXY CARBORANYL POLYMERS
Theodore L. Heying, North Haven, Stelvio Papetti, Hamden, and Otto G. Schaffling, Cheshire, Conn., assignors to Olin Mathieson Chemical Corporation, a corporation of Virginia
Filed July 21, 1964, Ser. No. 384,217
19 Claims. (Cl. 260—37)

ABSTRACT OF THE DISCLOSURE

Polymers having recurring structural units of the formula:

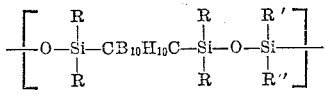

where each R and R'' substitutent is an independently selected alkyl groups of 1 to 6 carbon atoms or aryl group of not more than 8 carbon atoms, are prepared by reacting an alkoxy-substituted neocarborane with a halogen-containing silane in the presence of ferric chloride. Polymers especially suitable for cross-linking by curing can be prepared in the same manner as described above through the addition of a silane-type, cross-linking agent.

---

This invention relates to novel polymers containing both silicon and boron and to a method for their preparation. More particularly, this invention relates to polymers prepared by reacting an alkoxy-substituted neocarborane and one or more halogen-containing silanes in the presence of a catalyst.

The novel linear polymers of this invention contain a multiplicity of structural units of the following formula:

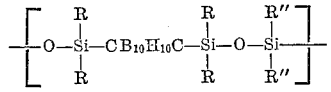

wherein each R substituent and each R'' substituent is an independently selected alkyl group of from 1 to 6 inclusive carbon atoms or an independently selected aryl group of not more than 8 carbon atoms. The —CB$_{10}$H$_{10}$C— unit in the above formula is derived from the meta isomer of carborane (i.e., neocarborane) which has the formula:

$$HCB_{10}H_{10}CH$$

The spatial structure of neocarborane is shown in the drawing. The infrared spectrum of neocarborane is set forth by Grafstein et al. in Inorganic Chemistry, vol. 2, No. 6, December 1963, p. 1129.

In the method of this invention polymers containing both silicon and boron are prepared by the condensation of an alkoxy-substituted neocarborane of the formula:

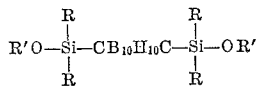

wherein each R substituent is an independently selected alkyl group of from 1 to 6 inclusive carbon atoms or aryl of not more than 8 carbon atoms and R' is alkyl of from 1 to 5 inclusive carbon atoms, with a halogen-containing silane of the formula:

wherein each R'' substitutent is an independently selected alkyl group of from 1 to 6 inclusive carbon atoms or an independently selected aryl group of not more than 8 carbon atoms and X is a halogen selected from the group consisting of chlorine, bromine, and iodine, in the presence of ferric chloride. Halogen-containing disilanes suitable as starting materials in the process of this invention include dimethyldichlorosilane, methyl-n-propyldichlorosilane, diethyldichlorosilane, ethylmethyldichlorosilane, diisopropyldichlorosilane, diamyldichlorosilane, dihexyldichlorosilane, diphenyldichlorosilane, methyltolyldichlorosilane, dixylyldichlorosilane, ethylisobutyldichlorosilane, n-propyltolyldichlorosilane, etc., and the corresponding bromine and iodine derivatives.

Included in the group of alkoxy-substituted neocarboranes useful as starting materials are bis(methoxydimethylsilyl)neocarborane, bis(methoxydiethylsilyl)neocarborane, bis(methoxymethylethylsilyl)neocarborane, bis(ethoxydipropylsilyl)neocarborane, bis(ethoxydimethylsilyl)neocarborane, bis(ethoxydi-n-propylsilyl)neocarborane, bis(ethoxyethylisopropylsilyl)neocarborane, bis(n-propoxydiisopropylsilyl)neocarborane, bis(n-propoxydiisoamylsilyl)neocarborane, bis(isopropoxydi-n-propylsilyl)neocarborane, bis(n-butoxydimethylsilyl)neocarborane, bis(isobutoxydi-n-propylsilyl)neocarborane, bis(methoxydiphenylsilyl)neocarborane, bis(methoxymethylphenylsilyl)neocarborane, bis(methoxyphenyltolylsilyl)neocarborane, bis(ethoxydixylylsilyl)neocarborane, bis(isobutoxydiphenylsilyl)neocarborane, bis(amyloxyphenylxylylsilyl)neocarborane, etc. These compounds can be made in the manner described in Heying and Papetti application, Ser. No. 361,409, filed Apr. 21, 1964, for Method and Composition. For example, the compound bis(methoxydimethylsilyl)neocarborane can be synthesized by reacting bis(chlorodimethylsilyl)neocarborane for 3 hours at room temperature with an excess of methanol.

In this invention, the reaction proceeds as shown below where, for purposes of illustration, the reaction between bis(methoxydimethylsilyl)neocarborane and dimethyldichlorosilane is shown:

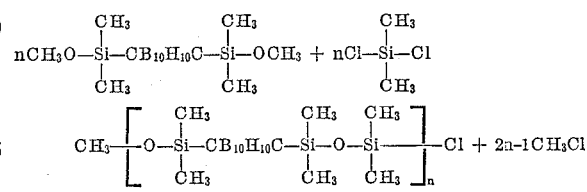

During the course of the reaction of the alkyl chloride is given off and by measuring the gas evolved the extent of the reaction can be determined.

The temperature at which the reaction is carried out can be varied widely from about 75° to about 250° C. and preferably will be from about 90° to about 125° C. in the beginning and up to the time that about one half of the stoichiometric amount of the gaseous alkyl chloride is evolved. To complete the reaction it has been found necessary to increase the reaction temperature up to about 120° C. to about 250° C. and preferably up to about 120° C. to about 190° C. During the second stage of the reaction generally the reaction rate is much slower than during the first stage. The initial liquid reaction mixture becomes viscous after about 90 percent of the theoretical quantity of the alkyl chloride has been evolved and after about 95 percent has been evolved, the viscous material becomes a tacky rubbery product. On continued heating of this product at about 150° to about 250° C. for one hour or more the product loses its tackiness. Thus, by varying the reaction time and temperature a wide variety of products with different physical properties can be prepared. The reaction time can be varied widely and generally will be from about 0.5 hour to about 5 hours depending on the reaction conditions and particular reactants employed. Higher temperatures have been investigated for this reaction, but they do not accelerate the rate and temperatures above about 250° C. must be avoided since the activity of the catalyst is slowly destroyed at such high temperatures.

The polymeric products of this invention range from liquids to completely rubbery materials. By the process of this invention polymeric products having a molecular weight from about 2,000 to about 100,000 or more can be conveniently prepared.

The liquid products of this invention are generally soluble in a wide variety of organic liquids such as ethers, ketones and aromatic hydrocarbons, as exemplified by diethyl ether N-methyl - 2-pyrrolidone, methyl ethyl ketone, decalin, chlorobenzene, o-dichlorobenzene, bromobenzene, aniline and xylene. The rubbery materials are insoluble or only partially soluble in organic solvents depending on the degree of polymerization. Thus, by the process of this invention one may obtain rubbery products which are not tacky and which are insoluble in organic solvents.

The amount of the ferric chloride catalyst can be varied from about 0.01 to about 10 mole percent, based on the total number of moles of the neocarborane compound employed and preferably will be from about 0.05 to about 3.0 percent on the same basis. If during the course of the reactions the rate of reaction decreases to a low level or if the reaction ceases, it can be reinitiated by adding an additional quantity of ferric chloride. Elimination of the catalyst from the solid polymer product can be accomplished by a number of methods such as by cutting the product into small sections and washing it with acetone or a mixture of acetone and water in which the higher polymer is practically insoluble. The catalyst can be removed from the liquid polymers by dissolving the product in benzene or diethyl ether followed by washing with water. Recovery of the purified polymer is accomplished by evaporating the benzene or ether layer to dryness.

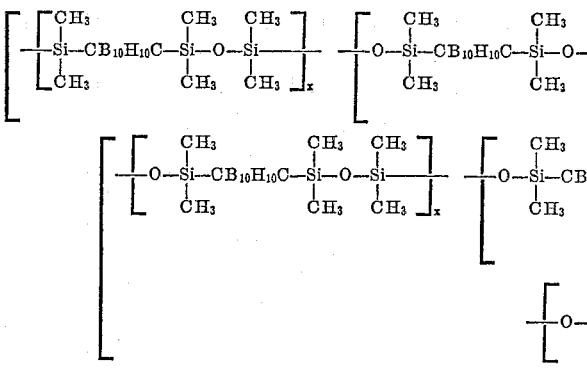

For those products soluble in organic solvents the molecular weight can be determined by the differential vapor pressure techniques at 100° and 130° C. using as a medium o-chlorobenzene or any other suitable material. It has been found that in order to obtain a high molecular weight material, it is necessary to use relatively pure starting materials and to react about one mole of the alkoxy-substituted neocarborane with each mole of the halogen-containing disilane employed.

Polymers especially suitable for cross-linking by curing can be prepared by the process of this invention through the addition of silane-type, cross-linking agent. Generally from about 0.1 to about 25 mole percent of the cross-linking agent based on the number of moles of the alkoxy-substituted neocarborane utilized in the reaction mixture will be employed. Suitable cross-linking agents include silanes of the formula:

wherein R''' is selected from the group consisting of hydrogen, alkyl or from 1 to 6 inclusive carbon atoms, vinyl, allyl, and isopropenyl, R'''' is selected from the group consisting of alkyl of from 1 to 6 carbon atoms, vinyl, allyl and isopropenyl and and wherein at least one of R''' and R'''' is hydrogen, vinyl, allyl or isopropenyl. Examples of useful cross-linking silanes are methyldichlorosilane, methylvinyldichlorosilane, divinyldichlorosilane, methylallyldichlorosilane, ethylallyldichlorosilane, n - propylallyldichlorosilane, ethylisopropenyldichlorosilane, diallyldichlorosilane, isobutyldichlorosilane, etc., and the corresponding bromine and iodine derivatives.

To prepare a cross-linked polymer of this invention from, for example, bis(methoxydimethylsilyl)neocarborane, methylvinyldichlorosilane and dimethyldichlorosilane, a linear condensation polymer (Polymer A) having randomly distributed units of the formula:

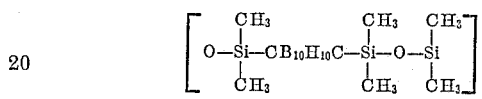

and of the formula:

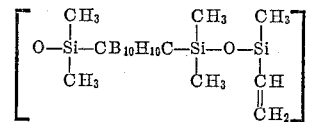

is first prepared in the same manner as previously described for the preparation of polymers from an alkoxy-substituted neocarborane and a dialkyldihalosilane.

In a second step these randomly joined units can be cross-linked to form hard rubber-like materials through the application of heat or of heat and pressure. Although the structural formulae of the cross-linked polymers of this invention have not been definitely established, one postulated mechanism for the cross-linking of units of Polymer A is illustrated below:

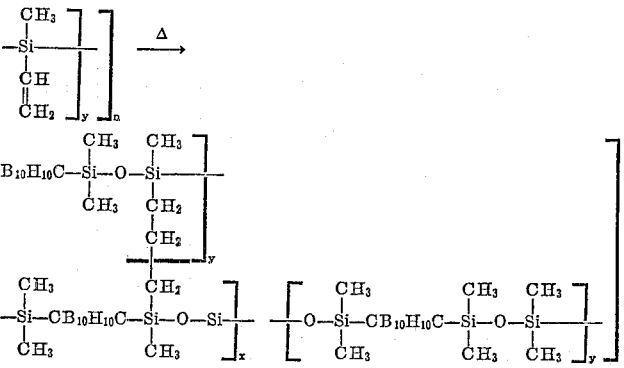

wherein $x$ is an integer greater than $y$.

The elastic, soft rubbery-type polymeric materials of this invention prepared by reacting (1) an alkoxy-substituted neocarborane and a dialkyldihalosilane and (2) polymers prepared from an alkoxy-substituted neocarborane, a dialkyldihalosilane and a silane-type, cross-linking agent can be cured to hard rubbers which have remarkable physical properties. Cured products prepared from the novel polymers of this invention after being heated under nitrogen for 24 hours at 400° C. exhibit tensile strengths of about 100 p.s.i. Other cured polymeric products of this invention have been made having, at room temperature, tensile strengths of from about 150 p.s.i. to about 325 p.s.i. depending on the filler and curing conditions employed.

The polymers of this invention are cured by heating for about 1 to about 48 hours or more at a temperature of from about 70° C. to about 300° C. in the presence of an organic peroxide catalyst, a sulfur-containing curing agent or a combination of sulfur and a sulfur-containing curing agent. Pressures of from about 100 p.s.i. to 10,000 p.s.i. are also preferably employed.

Suitable peroxide catalysts include capryl, lauryl, benzoyl, dicumy, methylethyl ketone, and di-t-butyl peroxides, t-butyl hydroperoxide and cumene hydroperoxide, or any other peroxide or hydroperoxide which has a long enough half life to ensure curing at the elevated temperatures employed. The preferred quantity of peroxide will be between 0.2 percent and 3 percent based on the polymer weight. The most useful peroxides are those with the highest half lives at the most useful curing temperature range which is between about 100° and about 150° C. Such peroxides are exemplified by dicumyl, methyl ethylketone, and di-t-butyl peroxide, t-butyl hydroperoxide, cumene hydroperoxide, and 2,5-bis(tert. butylperoxy)-2,5-dimethylhexane. Peroxides with short half-lives, such as benzoyl peroxide, in the 100° and 150° C. temperature range can be utilized if longer curing times at these lower temperatures can be tolerated.

Sulfur-containing curing agents suitable for use with the polymers of this invention include benzothiazole-2-thiol 2,2'-benzothiazyl disulfide, zinc benzothiazyl sulfide, tetramethylthiurammonosulfide, di-N-pentamethylene thiuramtetrasulfide, piperidinium - N-pentamethylenedithiocarbamate, zinc dibenzyldithiocarbamate, bismuth dimethyldithiocarbamate, lead dimethyldithiocarbamate, tellurium diethyldithiocarbamate, zinc dibutyldithiocarbamate, zinc butyl xanthate, and dibutyl xanthogen disulfide. Sulfur in an amount up to about six times the weight of the sulfur-containing curing compound if desired can also be utilized in preparing cured products from the novel polymers of this invention. Generally the combined weight of the sulfur and the sulfur-containing curing agent employed will be from about 0.5 percent to about 10 percent of the weight of polymer being cured with the minimum amount of the sulfur-containing curing agent being not less than 0.5 percent of the weight of the polymer.

Oxides of the lead, mercury and zinc, glass fiber, silica fiber, talc, asbestos, etc., can be used as fillers for the polymers of this invention. In addition, pigment type fillers such as titanium dioxide, carbon black, lithopone and iron oxide, can also be employed.

Finely divided silica of all types, such as precipitated silica, etc., is especially valuable as a filler for use with the polymers of this invention. Silica having a particle size of from about 0.005 microns to about 0.050 microns is particularly useful as a reinforcing agent and filler.

The polymeric products of this invention are useful in a wide variety of applications such as for gaskets, O-rings, encapsulation materials, etc., especially where the ability to withstand elevated temperatures is required.

Various embodiments of this invention are illustrated in the following examples which are to be considered not limitative.

Example I

Bis(methoxydimethylsilyl) neocarborane (47.35 g., 0.1476 mole), dichlorodimethylsilane (19.0468 g., 0.1476 mole) and 1 mole percent of anhydrous ferric chloride (based on the number of moles of the neocarborane starting material added) were mixed in a 300 ml. single-neck flask which was equipped with condenser, stirring bar and a nitrogen inlet line. The reaction flask was also connected to a vacuum line having a bubble-off. A wet test meter was connected to the bubble-off to measure the gas evolution.

The flask was placed on an oil bath and heated at a temperature between 100° and 120° C. although the reaction was vigorous in the first phase, after about 30 minutes the reaction ceased. A second portion of ferric chloride catalyst was added (about 1 mole percent based on the weight of the neocarborane starting material) and the reaction mixture was heated at a temperature of 180°–185° C. until the reaction had run to completion as evidenced by the total amount of gas evolved. The resulting product was a rubbery material which was not soluble in the common organic solvents. The elimination of ferric chloride from the product was achieved by washing the milled gum first with acetone, then with 10 percent water solution in acetone and finally with acetone. With this technique, the iron content of the thus treated rubbery product was reduced to about 0.01 percent by weight. The yield of polymeric product was essentially quantitative.

By infrared analysis it was determined that the product consisted of recurring units of the formula:

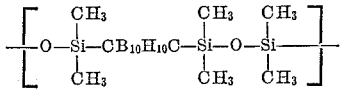

Example II

Bis(methoxydimethylsilyl) neocarborane (16.10 g., 0.05 mole), dichlorodimethylsilane (6.15 g., 0.0477 mole), methylvinyldichlorosilane (0.35 g., 0.0025 mole) and 2 mole percent of anhydrous ferric chloride which was added in two equal increments (based on the total number of moles of neocarborane compounds) were reacted in the same manner as in the previous experiment.

The product, a rubbery material, which exhibited only a slight tackiness was washed first with acetone and then with acetone and water to eliminate the catalyst. The yield of the rubbery product was essentially quantitative. By infrared analysis it was determined that the linear polymer formed consisted of units of the formula:

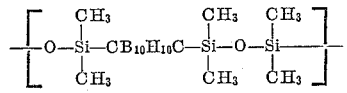

and of the formula:

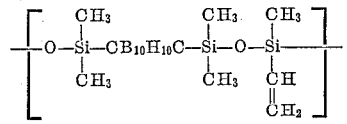

Example III

This experiment was conducted in the same type of apparatus and in a manner identical to that of Example I.

Bis(methoxydimethylsilyl) neocarborane (5.27 g., 0.0195 mole), dibutyldichlorosilane (4.158 g., 0.0195 mole) and 1 mole percent of anhydrous ferric chloride (based on the number of moles of the neocarborane compound) were reacted at a temperature at 145°–180° C. for 40 minutes at the end of which time the evolution of gas had ceased.

Additional small quantities of ferric chloride catalyst were added (total about 1 mole percent based on the number of moles of the neocarborane starting material) and the reaction was continued at 180° C. until it had run to completion as determined by the total gas evolution. A very viscous liquid product was obtained which was dissolved in ethyl ether and the solution treated with water. The ether layer was decanted and taken to dryness yielding a polymeric product in essentially quantitative yield which was a very viscous liquid having a molecular weight of 4070.

The product was analyzed for carbon, hydrogen, boron and silicon and the following results were obtained:

Cal'd. for $C_{14}H_{40}B_{10}O_2Si_3$: C, 38.84; H, 9.31; B, 24.99; Si, 17.66. Found: C, 39.5; H, 9.48; B, 23.35; Si, 17.0.

By infrared analysis it was determined that the product consisted of recurring units of the formula:

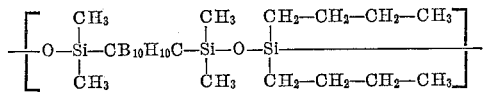

Example IV

This experiment was conducted in the same type of apparatus and in a manner identical to that of Example I.

Bis(methoxydimethylsilyl) neocarborane (5.76 g., 0.018 mole), diphenyldichlorosilane (4.545 g., 0.018 mole) and 1 mole percent of anhydrous ferric chloride (based on the number of moles of the neocarborane compound starting material used) were reacted at a temperature of 125°–185° C. for 90 minutes at the end of which time the reaction ceased. During this heating period about half of the theoretical amount of gas was evolved.

Small additional amounts of ferric chloride were added occasionally (total amount was about 1 mole percent based on the number of moles of the neocarborane starting material) and heating was continued at 100°–180° C., until the reaction appeared to be complete. The reaction product, a viscous liquid, was dissolved in 150 ml. of ethyl ether and the resulting solution was treated with water to eliminate the catalyst. Evaporation of the ether layer to dryness gave a viscous liquid product in essentially quantitative yield having a molecular weight of 8917.

By infrared analysis it was determined that the product consisted of recurring units of the formula:

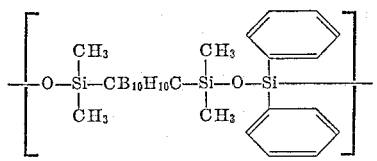

Example IX

In Examples V–IX a number of polymeric products were prepared in the same manner as described in Example I. Pertinent details relating to these examples are given in Table 1 below:

TABLE I

| Example | Reactor Charge | | | | Reaction Temperature (° C.) | Product |
|---|---|---|---|---|---|---|
| | A | B | C | D | | |
| V | 0.0634 | 0.0634 | 0 | 0.00127 | 100–190 | Rubbery material.[1] |
| VI | 0.0502 | 0.0502 | 0.00251 | 0.00100 | 100–190 | Do.[2] |
| VII | 0.12528 | 0.1246 | 0.0068 | 0.002506 | 100–190 | Do.[2] |
| VIII | 0.36805 | 0.36523 | 0.00552 | 0.00736 | 100–190 | Do.[2] |
| IX | 0.3869 | 0.3869 | 0 | 0.00776 | 100–190 | Do.[1,3] |

[1] By infrared analysis it was determined that the product was composed of units identical to that of Example I.
[2] By infrared analysis it was determined that the product was composed of units identical to that of Example II.
[3] The product of Example IX was analyzed for hydrogen, boron and silicon and the following results were obtained:

| | H | B | Si |
|---|---|---|---|
| Calc'd. for $C_8H_{28}B_{10}O_2Si_3$ | 8.09 | 31.02 | 24.16 |
| Found | 7.76 | 31.59 | 24.59 |

A—bis(methoxydimethylsilyl) neocarborane.
B—dichlorodimethylsilane.
C—methylvinyldichlorosilane.
D—ferric chloride.

Example X

Bis(methoxydimethylsilyl)neocarborane (33.67 g., 0.105 mole), dichlorodimethylsilane (0.1034 mole), methyldichlorosilane (0.184 g., 0.0016 mole) and 2 mole percent of anhydrous ferric chloride (based on the number of moles of the neocarborane employed), which was added in two equal increments, were reacted in the same manner as in Example I. The product, a rubbery material, was washed first with acetone to eliminate the catalyst.

By infrared analysis it was determined that the resulting polymer, which was recovered in essentially quantitative yield consisted of units of the formula:

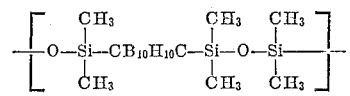

and of the formula:

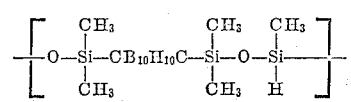

Example XI 5 g. of the polymeric product prepared as described in Example V was milled with 1.66 g. of finely divided titanium dioxide and 0.10 g. of dicumylperoxide (40 percent by weight supported on calicum carbonate) and added to a 2 inch, round mold, and pressed to 800 p.s.i. The mold and contents were heated to 150° C., kept at that temperature for 1 hour and then allowed to cool to room temperature. The disc, thus obtained, was heated for about 16 hours in an air circulating oven to yield a soft, rubbery product.

Example XII 5 g. of the polymeric product prepared as described in Example VIII was milled with 1.25 g. of finely divided silica having a particle size of about 0.015 micron and 0.05 g. of benzoyl peroxide. The mix was added to a 2 inch round mold and pressed in a preheated press at 800 p.s.i. for 30 minutes at a temperature of 125° C. The resulting disc was cured for 24 hours in an air circulating oven to give a slightly tacky, rubbery product.

Example XIII 5 g. of the polymer prepared in Example VII was milled with 0.05 g. of 2,5-bis(tert. butylperoxy)-2,5-dimethylhexane and 1.25 g. of finely divided silica having a particle size of about 0.015 micron.

The mix was pressed into a 2 inch diameter round mold at 1000 p.s.i., heated to 170° C. and maintained at that temperature for 2 hours. The mold and contents were cooled under pressure to ambient temperature. The pressed disc was then removed from the mold and heated for 16 hours at 200° C. in an air circulating oven to yield a soft, very elastic, rubbery product.

Example XIV 5 g. of the polymer produced in Example VI was milled with 1.25 g. of finely divided silica having a particle size of about 0.015 microns and 0.10 g. dicumyl peroxide (40 percent by weight supported on calcium carbonate), then loaded into a 2 inch round mold and pressed to 500 p.s.i. The mold and contents were heated to 150° C. and maintained at that temperature for 1 hour. The solid disc thus formed, which was a soft, brown elastic rubber was removed from the mold and heated in an air circulating oven for 16 hours to give a soft, brown, elastic rubber. This product was post-cured at 200° C. for 6 hours to yield a hard, well-cured rubber.

Example XV 5 g. of polymer prepared as described in Example VIII was milled with 1.25 g. of finely divided silica having a particle size of about 0.015 micron and 0.150 g. of benzotriazole-2-thiol and pressed in a 2 inch round mold at 1800 p.s.i. at temperature of about 150° to 160° C.

for 1 hour. After being removed from the mold, the rubbery disc thus formed was heated for 24 hours at 200° C. in an air circulating oven to yield a hard, well-cured rubber.

What is claimed is:

1. A linear polymeric condensation product having essentially units of the structure:

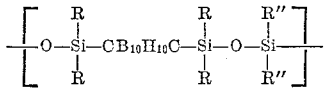

wherein each R and R″ substituent is independently selected from the group consisting of alkyl of from 1 to 6 inclusive carbon atoms and aryl of not more than 8 carbon atoms, the said linear polymeric condensation product having a molecular weight of from about 2000 to about 100,000.

2. The product of claim 1 wherein each R and each R″ is methyl.

3. The product of claim 1 wherein each R is methyl and each R″ is phenyl.

4. The product of claim 1 wherein each R is methyl and each R″ is butyl.

5. A linear polymeric condensation product comprising, in combination, a plurality of units of the formula:

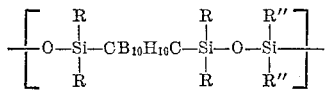

wherein each R and R″ substituent is independently selected from the group consisting of alkyl of from 1 to 6 inclusive carbon atoms and aryl of not more than 8 carbon atoms, and units of the formula:

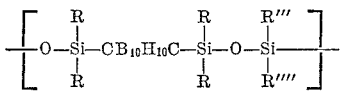

wherein each R is independently selected from the group consisting of alkyl of from 1 to 6 inclusive carbon atoms and aryl of not more than 8 carbon atoms, R‴ is selected from the group consisting of alkyl of from 1 to 6 inclusive carbon atoms hydrogen, vinyl, allyl, and isopropenyl, R″″ is selected from the group consisting of alkyl of from 1 to 6 inclusive carbon atoms, vinyl, allyl and isopropenyl, and wherein at least one of R‴ and R″″ is selected from the group consisting of hydrogen, vinyl, allyl and isopropenyl, said units being joined in random arrangement and said linear polymeric condensation product having a molecular weight of from about 2000 to about 100,000.

6. The product of claim 5 in which each R is methyl, each R″ is methyl R‴ is methyl and R″″ is vinyl.

7. The product of claim 5 wherein each R is methyl, each R″ is methyl, R‴ is methyl and R″″ is hydrogen.

8. A curable composition comprising (A) a linear polymeric condensation product having essentially units of the structure:

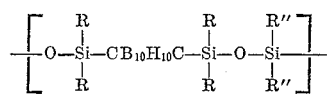

wherein each R and R″ substituent is independently selected from the group consisting of alkyl of from 1 to 6 inclusive carbon atoms and aryl of not more than 8 carbon atoms, the said linear polymeric condensation product having a molecular weight of from about 2000 to about 100,000 and (B) a curing agent selected from the group consisting of an organic peroxide and a sulfur-containing curing agent.

9. The curable composition of claim 8 wherein R and R″ in the said units are methyl.

10. The curable composition of claim 8 wherein the said curing agent is an organic peroxide.

11. The curable composition of claim 8 wherein the said composition contains from about 5 to about 400 percent of an inorganic filler based on the weight of the linear polymeric condensation product.

12. The curable composition of claim 11 wherein the R and R″ substituents in the said units are methyl, wherein the inorganic filler is silica having an average particle size of from about 0.005 microns to about 0.050 microns and wherein the said catalyst is dicumyl peroxide.

13. The product formed by curing the composition of claim 8.

14. A curable composition comprising (A) a linear polymeric condensation product comprising, in combination, a plurality of units of the formula:

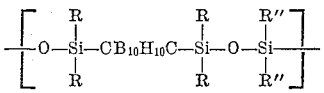

wherein each R and R″ substituent is independently selected from the group consisting of alkyl of from 1 to 6 inclusive carbon atoms and aryl of not more than 8 carbon atoms and units of the formula:

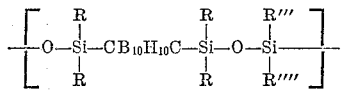

wherein each R is independently selected from the group consisting of alkyl of from 1 to 6 inclusive carbon atoms and aryl of not more than 8 carbon atoms, R‴ is selected from the group consisting of alkyl of from 1 to 6 carbon atoms, hydrogen, vinyl, allyl and isopropenyl, R″″ is selected from the group consisting of alkyl of from 1 to 6 carbon atoms, vinyl, allyl and isopropenyl, and wherein at least one of R‴ and R″″ is selected from the group consisting of hydrogen, vinyl, allyl and isopropenyl, said units being joined in random arrangement and the said linear polymeric condensation product having a molecular weight of from about 2000 to about 100,000 and (B) a curing agent selected from the group consisting of an organic peroxide and a sulfur-containing curing agent.

15. The curable composition of claim 14 wherein each R is methyl, each R″ is methyl, R‴ is methyl and R″″ is vinyl.

16. The curable composition of claim 14 wherein the said curing agent is an organic peroxide.

17. The curable composition of claim 14 wherein the said composition contains from about 5 to about 400 percent of an inorganic filler based on the weight of the linear polymeric condensation product.

18. The curable composition of claim 17 wherein R, R″, and R‴ in the said units are methyl, R″″ is vinyl, wherein the inorganic filler is silica having an average particle size of from about 0.005 microns to about 0.050 microns and wherein the said catalyst is dicumyl peroxide.

19. The product formed by curing the composition of claim 14.

References Cited

UNITED STATES PATENTS 3,137,719 6/1964 Papetti _____ 260—448.2
3,226,429 12/1965 Grafstein et al. ____ 260—606.5

OTHER REFERENCES

Grafstein et al., Inorg. Chem., vol. 2, No. 6, December 1963, pp. 1128–1133.

K. A. Andrianov, "Polymers with Inorganic Main Chains" U.S. Dept. Comm. Clear. House, JPRS: 20, 272; TT63–3141 July 1963, pp. 253–260, 329 relied upon.

W. S. Penn, Synthetic Rubber Technology, vol. 1, Maclaren and Sons Ltd., London, 1960. Call No. TS 1925 P45 pp. 279, 280, 291–293 relied upon.

JULIUS FROME, *Primary Examiner.*

MORRIS LIEBMAN, *Examiner.*

J. E. CALLAGHAN, *Assistant Examiner.*